United States Patent [19]

McMurtry

[11] 4,349,946
[45] Sep. 21, 1982

[54] TOOL CONNECTING MECHANISM

[76] Inventor: David R. McMurtry, 'Undercroft', Wotton-under-Edge, Gloucestershire, England

[21] Appl. No.: 136,093

[22] Filed: Mar. 31, 1980

[30] Foreign Application Priority Data

Mar. 30, 1979 [GB] United Kingdom ................. 7911328

[51] Int. Cl.³ .......................................... B23Q 3/155
[52] U.S. Cl. ........................................ 29/57; 29/568; 279/16; 409/126; 409/231
[58] Field of Search ......................... 29/568, 26 A, 57; 279/77, 1 B, 78, 16; 409/126, 233, 231, 232

[56] References Cited

U.S. PATENT DOCUMENTS

| | | | |
|---|---|---|---|
| 2,625,402 | 1/1955 | Dick | 279/16 |
| 2,767,564 | 10/1956 | Green | 279/16 |
| 3,028,770 | 4/1962 | Pittwood | 29/26 A |
| 4,046,263 | 9/1977 | Cwycyshyn | 29/568 |

FOREIGN PATENT DOCUMENTS

| | | | |
|---|---|---|---|
| 2852502 | 6/1979 | Fed. Rep. of Germany | 29/568 |
| 1429049 | 3/1976 | United Kingdom | 409/233 |
| 1445977 | 8/1976 | United Kingdom | 409/126 |

*Primary Examiner*—William R. Briggs
*Attorney, Agent, or Firm*—Spencer & Kaye

[57] ABSTRACT

A tool connecting mechanism comprising two connecting members mutually engageable by movement of one member relative to the other along and about an axis. The members have respective support elements constituted as a kinematic support whereby, when engaged, the members are supported one on the other against relative displacement transversely to or about said axis.

5 Claims, 5 Drawing Figures

TOOL CONNECTING MECHANISM

BACKGROUND OF THE INVENTION

This invention relates to a tool connecting mechanism for machine tools. The tool to be connected may be a probe for measuring a workpiece held in the machine tool or it may be a cutter for machining the workpiece.

It is known from United Kingdom Pat. No. 1,445,977 to provide a probe for use in measuring workpieces, the probe comprising a first and a second number, one of the members having three first support elements arranged at each of three locations spaced about an axis, the other member having three second support elements engageable with the respective first support elements, means for axially urging the members into engagement at said first and second elements, the first and second elements being constituted a kinematic support means locating the members against relative displacement transversely to or rotationally about said axis. One of the members is adapted to be secured to the head of a coordinate measuring machine and the other one of the members is a holder for a stylus for sensing a workpiece to be measured.

Such machines may be operated to carry out measuring operations automatically under the control of a programmed computer, and the need has arisen to be able also to change the stylus by an automatic operation. Automatic tool change apparatus is known in machine tools for example from United Kingdom Pat. No. 1,429,049 but such apparatus is relatively complicated.

SUMMARY OF THE INVENTION

According to the present invention the tool support mechanism is characterised in that:
the first support elements (25) extend radially outwardly and define open spaces (25B) angularly therebetween,
the second support elements (30) extend radially inwardly and define open spaces (30B) angularly therebetween,
the connecting members (22,23) are relatively displaceable axially to effect disengagement at said first and second elements
and, consequent on said disengagement, the members (22,23) are relatively rotatable about said axis (10A) to axially align one of the first and second elements (25,30) with the spaces (30B,25B) between the other of the first and second elements to enable the members to be separated axially.

BRIEF DESCRIPTION OF THE DRAWINGS

An example of connecting mechanism according to this invention will now be described with reference to the accompanying drawings wherein.

DESCRIPTION OF THE PREFERRED EMBODIMENTS

Figure 1:
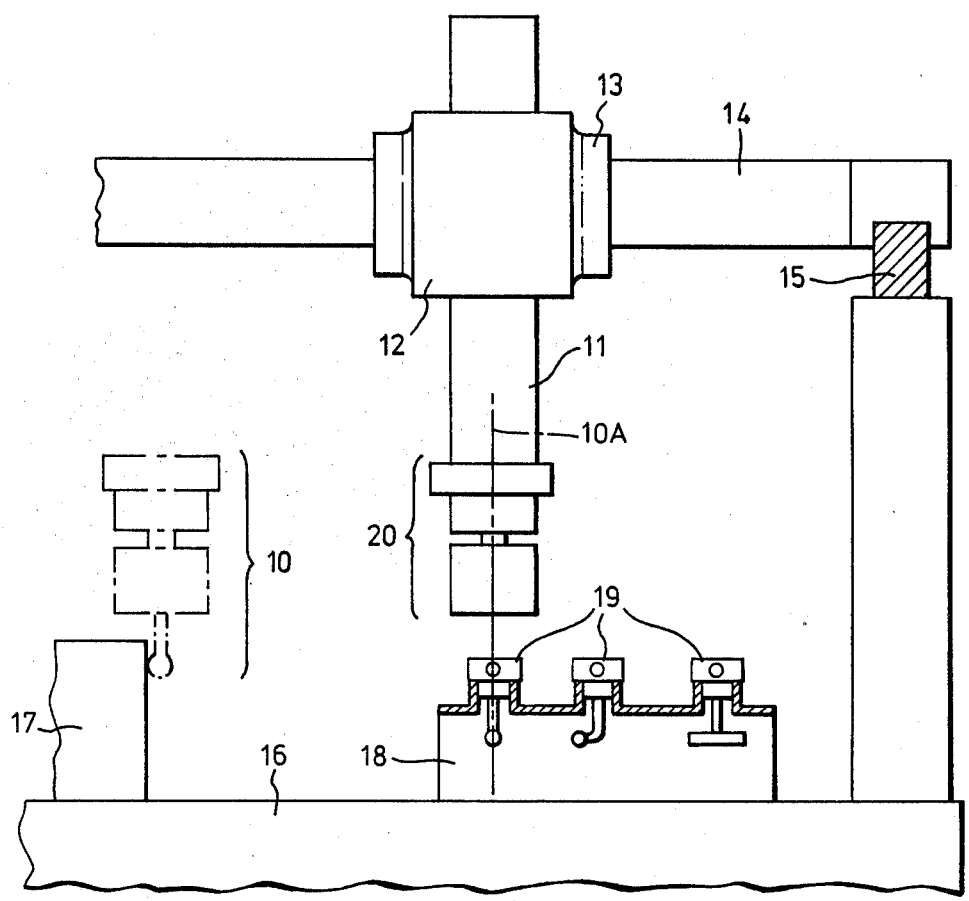
FIG. 1 is an elevation of a machine tool including the connecting mechanisms.

FIG. 1 shows a coordinate measuring machine having a probe assembly 10 supported for movement in the X, Y and Z dimensions of the orthogonal coordinate system. To this end the assembly 10 is connected to the bottom end of a vertically disposed elongate member or quill 11 supported for longitudinal motion in the Z direction in a bearing 12 integral with a carriage 13 supported for motion in the X direction along a beam 14 itself supported for motion in the Y direction on a track 15 mounted on a table 16 on which a workpiece 17 to be measured is supported. The table also supports a storage rack 18 being a support for different stylus units 19 to be used in the probe assembly for different types of measuring operations. The quill 11 is driven to pick up any one of the units 19 and to return the unit 19 to the rack. To this end the quill 11 is driven by motors controlled by a computer in a manner well known per se.

Figure 2:
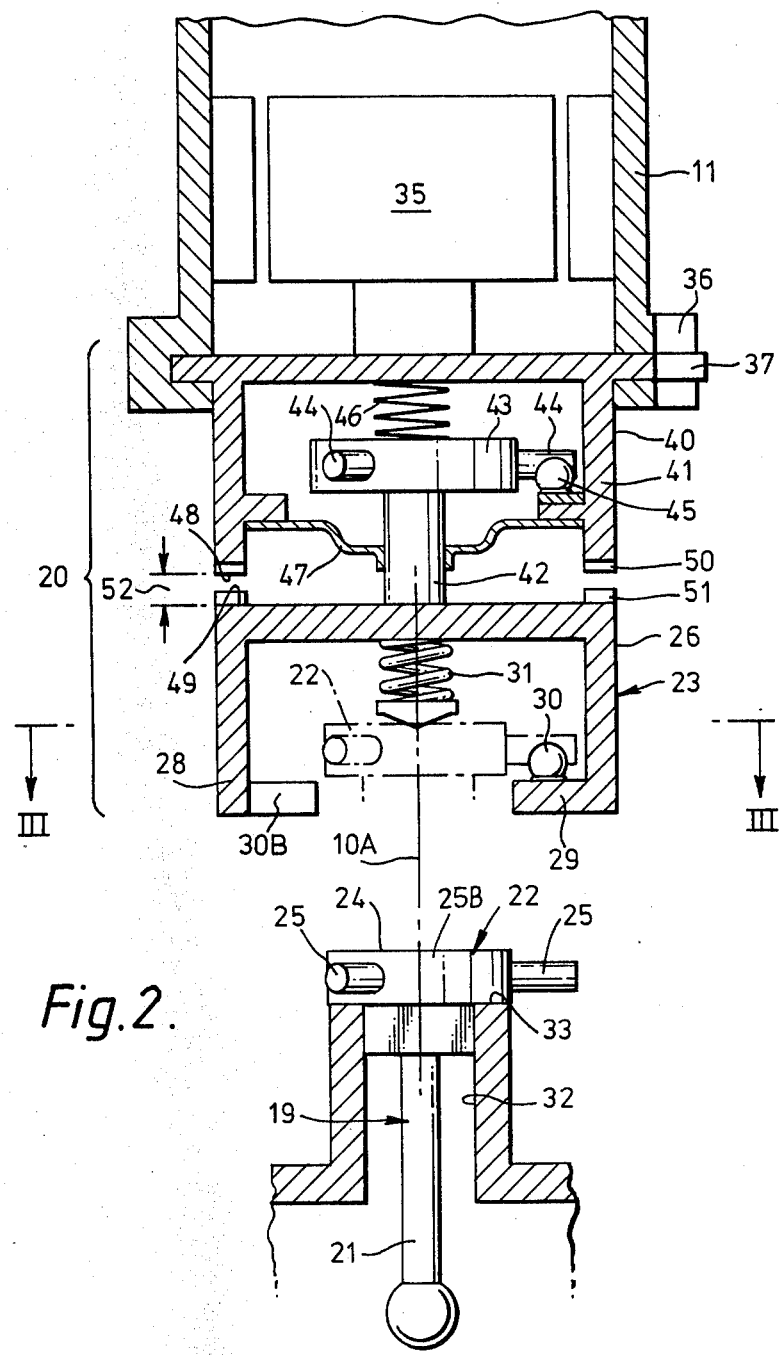
FIG. 2 is an enlarged sectional detail of FIG. 1.
Figure 3:
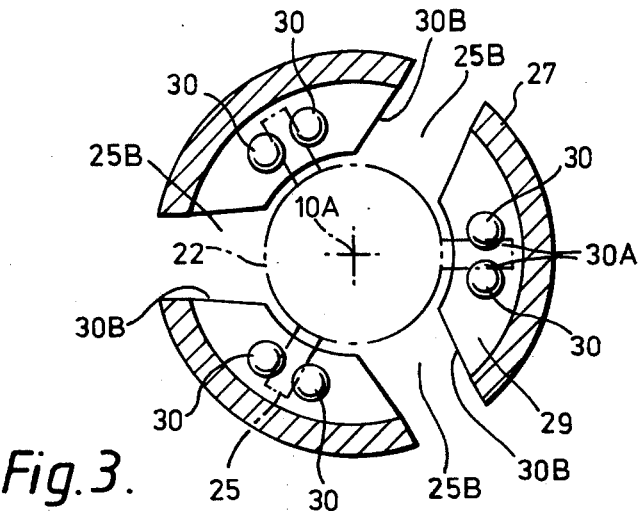
FIG. 3 is a section on the line III—III in FIG. 2.

Referring to FIGS. 2 and 3, the probe assembly 10 has an axis 10A and comprises a said unit 19 and a support unit 20. The unit 19 comprises a stylus 21 and a first connecting member 22. The support unit 20 comprises a second connecting member 23 engageable with the member 22. The member 22 comprises a disc-shaped head 24 and three cylindrical arms 25 extending radially outwardly from the head 24. The arms 25 define open spaces 25B angularly therebetween. The member 23 comprises a generally cylindrical housing 26 concentric with the axis 10A. The lower end of the housing 26 has three radially inward flanges 29, and each flange has secured thereto a pair of spherical supports 30 defining between them a pair of converging surfaces 30A. The pairs of supports 30 define open spaces 30B angularly therebetween. The upper end of the housing 26 has secured thereto one end of a compression spring 31. The arms 25 and supports 30 define first and second support elements respectively.

FIG. 2 shows the units 19,20 in the disengaged condition but in alignment on the axis 10A. The unit 19 is supported in a socket 32 of the rack 18, the head 24 resting on a support surface 33 of the socket 32. When it is required for the quill 11 to pick up the unit 19, the quill is lowered so that the elements 25,30 pass through the spaces 30B,25B and the lower end of the spring 31 abuts the top of the head 24. Further lowering of the quill 11 compresses the spring and brings the arms 25 into a position above the level of the spherical supports 30. The unit 20 is then rotated through 60° to bring the arms 25 into axial alignment with the respective pairs of convergent surfaces 30A, and the quill 11 is raised again whereby the spring 31 becomes free to urge the head 24 downward and thereby urge the arms 25 into engagement which the surfaces 30A. The arms 25 and convergent surfaces 30A constitute a kinematic support means ensuring, in cooperation with the spring 31, that the units 19, 20 are located against relative displacement transversely to and rotationally about the axis 10A, this condition being referred to as the "first rest position" of the stylus 21.

The rotation of the unit 20 is effected by an electric motor 35 arranged between the quill and the unit 20 substantially as shown, the rotation being limited by stops 36 on the quill cooperating with a lug 37 on the unit 20.

If the stylus 19 is to be returned to the rack 18 the above described operations are reversed.

The unit 20 includes a further housing 40 arranged between the housing 26 and the quill 11 and including a mounting 41 for the second connecting member 23. To this end the housing 26 is secured to the lower end of a shank 42 whose upper end has a third connecting member or head 43 having three radial arms 44 urged by a spring 46 into engagement with spherical supports 45 provided on the housing 40 which constitutes a fourth connecting member. The arms 44 and supports 45 define third and fourth support elements respectively. The arrangement is substantially the same as that of the arms 25, supports 30 and spring 31 and provides a second rest position for the stylus 21. However, whereas in the case of the member 23 the spring 31 is sufficiently stiff to prevent displacement from said first rest position under any working forces acting on the stylus 21, the spring 46 is sufficiently soft to allow displacement of the stylus from the second rest position. This is required to allow the sensing of the operative forces acting on the stylus, e.g. by sensing a change in electrical resistance between the arms 44 and the supports 45, when carrying out a measuring operation. Also the housing 40 can be fully closed as by rubber bellows 47 to ensure the cleanliness required for accurate seating at low spring pressures.

The housings 40,26 are spaced apart axially at a gap 52 to allow said displacement of the stylus, i.e. allow tilting of the head 43 on the supports 45 when the stylus engages the workpiece 17 during a measuring operation. When the quill 11 is lowered to pick up the unit 19 the relatively weaker spring 46 compresses before the spring 31. This closes a gap 52 and brings the housings 40,26 into axial engagement at surfaces 48,49 for transmission of the axial force necessary to compress the spring 31. Simultaneously, axial teeth 50,51 on the housings 40,26 engage for transmission of the torque of the motor 35.

Figure 4:
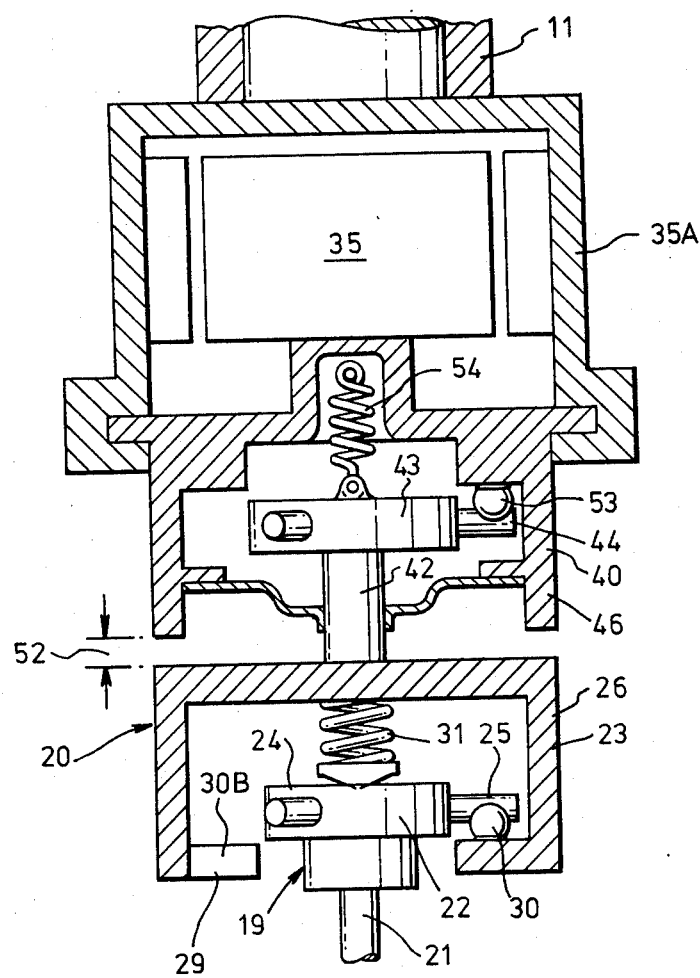
FIG. 4 is a view similar to FIG. 2 but showing a modification.

Referring to FIG. 4, spherical supports 53 are arranged above the arms 44 and a tension spring 54 is arranged between the head 43 and the housing 46 to urge the arms 44 against the supports 53. In all other respects the supports 53 are equivalent to the supports 45. When the quill 11 is lowered to pick up the unit 19 the gap 52 is not closed because the axial force for compression of the spring 31 is reacted directly by the supports 53. The torque for rotation of the housing 26 is also transmitted by the inclined surfaces of the supports 53. The gap 52 is of course still required to accommodate said tilting of the head 43 during a measuring operation. The spring 31 maybe made of substantially the same strength as the spring 54 so that both the heads 43, 22 can tilt during a measuring operation, the head 43 tilting downwardly and the head 22 tilting upwardly. If the measuring operation requires axial movement of the stylus, the arrangement allows such movement of the stylus towards or away from the quill 11 as may be required.

The motor 35 may be embodied in a housing 35A detachably secured to the lower end of the quill 11.

In a further modification (not illustrated) the head 43, supports 45 or 53 and spring 46 or 54 are dispensed with and the housings 26,40 are made as a single component. In such a case the spring 31 has to be sufficiently weak to allow displacement of the stylus for measuring operations.

However, the invention is not restricted to supporting a stylus in a measuring machine and may be applied generally to tool holders and automatic tool selector systems in machine tools. If a tool, e.g. a drill or small milling cutter, is used instead of a stylus, then the spring 31 must of course be strong enough to prevent displacement of the tool under the forces acting thereon in operation and the inclined surfaces 30A must be sufficiently steep to ensure firm location of the tool under such forces. On the other hand, the spring 31 may be sufficiently weak to give way if an excessive operating force acts on the tool and in this way the tool is protected against overload.

It will be clear that the motor 35 may be used to rotate the whole of the assembly 10 for the purpose of rotating a said drill or cutter. In such an arrangement the stops 36 and lug 37 are of course not used.

Figure 5:
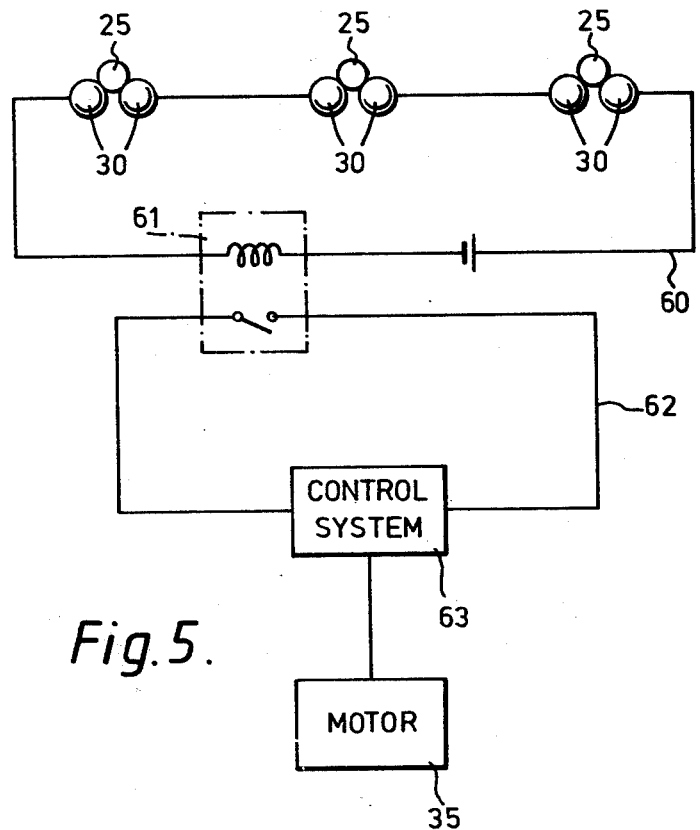
FIG. 5 is a circuit diagram.

Referring to FIG. 5 the supports 30 may be connected in an electric circuit 60 which is made when each of the arms 25 is seated on the respective pair of supports 30. The circuit is broken when one of the arms is displaced thereby de-energising a relay 61 to break a second circuit 62. The state of the circuit 62 is therefore an indication of whether or not the members 22,23 are properly connected. The circuit 62 may be connected to act on a system 63 controlling the motor 35 to de-energise this motor in case the members 22,23 become disconnected at one of the elements 25,30 due to overload on the tool.

I claim:

1. A tool connecting mechanism comprising:

a first connecting member adapted to support a tool;
a second connecting member for supporting said first member, each of said first and second members having three support elements arranged at three locations spaced apart on an axis, the support elements of one of said members extending radially outwardly and defining axially open spaces therebetween, and the support elements of the other member extending radially inwardly and defining axially open spaces therebetween;
urging means for axially urging said first connecting member in one sense of the direction of said axis into engagement with said second connecting member at said first and second support elements, one of said first and second support elements having axial projections, the other one of said first and second support elements defining axial recesses engageable by said projections under the force of said urging means, said projections and recesses being constituted in a kinematic support means and cooperating to positively locate said first connecting member on said second connecting member against displacement relative thereto transversely to and rotationally about said axis; and
means provided on said second connecting member defining space into which said first connecting member is movable in the other sense of said direction thereby to disengage said projections from said recesses and in which said first connecting member is rotatable into axial alignment between said support elements of said one connecting member and the spaces between said support elements of said other connecting member and thereby to free the first connecting member for axial withdrawal from the second connecting member in said one sense of direction.

2. A mechanism according to claim 1 wherein the means for axially urging the connecting members into engagement comprise a spring secured to one of the members and engaging the other member.

3. A mechanism according to claim 1 wherein said second connecting member is secured to a third connecting member supported on a fourth connecting member, the third and fourth connecting members being provided respectively with third and fourth support elements arranged about said axis; resilient means for axially urging the third and fourth members into engagement at said third and fourth support elements; and means for supporting the third and fourth members against displacement transversely to and rotationally about said axis.

4. A mechanism according to claim 3 wherein the third connecting member is situated at the side of the second connecting member remote from the first connecting member and the fourth support elements are situated at the side of the third support elements remote from the first connecting member so that an axial force urging the first connecting member toward the second connecting member is reacted by said fourth support elements.

5. A mechanism according to claim 2 wherein the spring is a compression spring secured to one of the connecting members and abutting the other connecting member to act thereon in the sense of separating the members when said elements are aligned with said spaces.

* * * * *